March 1, 1960 P. J. M. WULMS 2,926,699
HOSE, PARTICULARLY A FIRE HOSE AND A PROCESS FOR ITS MANUFACTURE
Filed May 23, 1956

INVENTOR.
PETRUS J. M. WULMS
BY
ATTORNEYS

United States Patent Office 2,926,699
Patented Mar. 1, 1960

2,926,699

HOSE, PARTICULARLY A FIRE HOSE AND A PROCESS FOR ITS MANUFACTURE

Petrus J. M. Wulms, Brunssum, Netherlands, assignor to N.V. Verenigde Textiel-En Oliefabrieken Afd. P. H. Kaars Sijpesteijn, Krommenie, Netherlands, a limited-liability company of the Netherlands Application May 23, 1956, Serial No. 586,884

Claims priority, application Netherlands June 3, 1955

1 Claim. (Cl. 138—55)

The invention relates to a hose, particularly a fire-hose with an outer hose of textile material and a lining therein consisting of a body of textile material coated with a water-impermeable layer, e.g. rubber or a plastic, as well as to a process for the manufacture of such a hose.

A hose of said type is known per se.

In said known hose the lining has an overlapping seam. This has the drawback that the inner surface of the hose is not entirely smooth, owing to which the flowing resistance of the hose is increased.

The invention relates to a hose entirely missing this drawback.

According to the invention the body, forming part of the lining, is a seamless knitted tube sometimes called a stocking.

Because this stocking is knitted its diameter is so variable that, even when it has been treated with latex, it adapts itself easily to the diameter of the outer hose.

By stretching in longitudinal direction the lining will fit in a hose with a smaller diameter. It will also give laterally to fit a larger diameter hose.

With this lining, consequently, an overlapping seam can be omitted.

For the manufacture of a hose according to the invention a knitted stocking is arranged on an inflatable carrying member provided with a coating preventing the sticking of the stocking to this member. After inflating this member a latex layer is applied to the stocking, the stocking is stripped from the member and turned inside out, whereupon the stocking is brought in this condition into the outer hose and connected with said outer hose by means of an adhesive.

Figure 1:
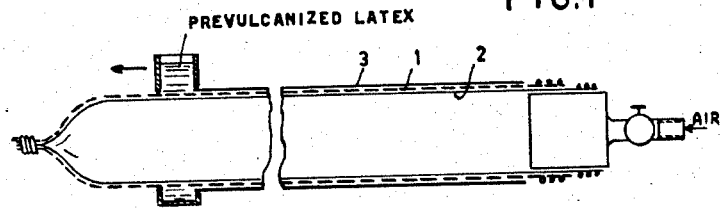
Figure 2:
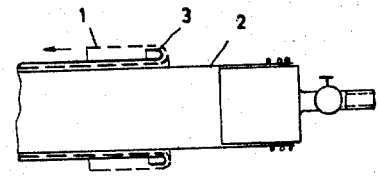
Figure 3:
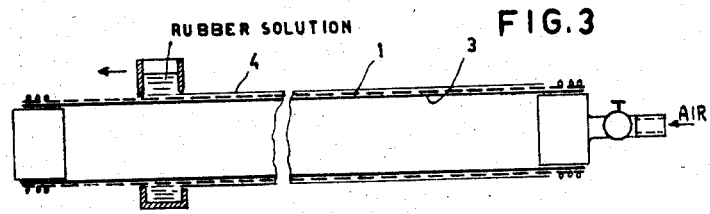
Figure 4:
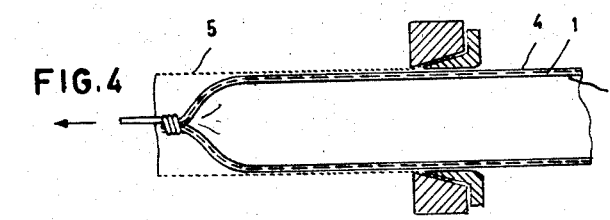
Figure 5:
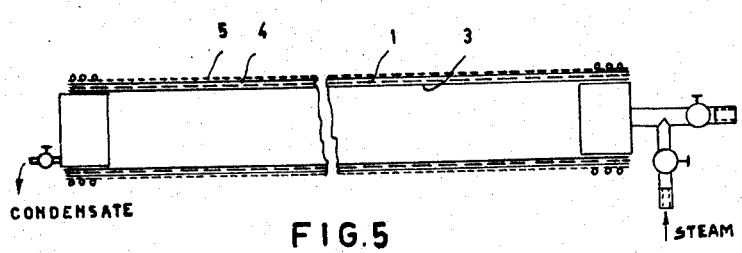

The foregoing and other objects of my invention will be apparent in the following description and drawings, in which:

Figure 1 shows the stocking 1 on the inflated carrier 2 being provided with a latex layer 3, Figure 2 shows the stocking partially stripped from the carrier. We may add that the carrier 2 is not entirely but only partially deflated to facilitate the reversing of the stocking, Figure 3 shows the same stocking removably fixed on end pieces being provided with a layer of rubber solution, Figure 4 shows the stocking being drawn into the hose 5, and Figure 5 shows the step by which the stocking is bonded to the outer hose.

A knitted lining stocking 1 is drawn on an inflatable carrier 2 which in inflated condition has approximately the desired diameter. The carrier is coated with a material to which latex will not adhere, thereby facilitating removal of the stocking after the processes subsequently described.

After inflation of the carrier a thin layer 3 of pre-vulcanized latex is applied to the stocking 1 by spreading (Figure 1), submerging and/or spraying, which stocking after drying is completely water-impermeable.

After this operation the stocking is treated with talcum, the air is released from the carrier and the stocking is stripped from the carrier and turned inside out (Figure 2). The latex layer then has been turned to the inside.

In the meantime a layer of rubber solution has been applied to the inside of an outer hose of textile material. This layer 4 can, if desired, also be arranged on the turned stocking 1 (Figure 3). When it has been dried a little zinc stearate is blown into the hose 5 to prevent sticking of the stocking 1 during the introduction into the outer hose 5, whereupon the inner stocking 1 is drawn in (Figure 4).

Vulcanisation is effected by means of steam which is introduced into the lining (Figure 5). The steam pressure effects at the same time a good distribution and pressing of the stocking against the outer hose.

In order to obtain a hose which does not tend to assume a round form, but on the contrary is inclined to fall flat when it is empty, during the vulcanizing operation the hose is maintained in a flattened unround shape.

What is claimed is:

A hose, particularly a fire hose, comprising an outer hose of textile material and a lining therein bonded to said outer hose and consisting of a seamless, knitted tube of textile material, extendable in its longitudinal and its transverse directions and coated on its inner surface with a layer of water-impermeable material.

References Cited in the file of this patent

UNITED STATES PATENTS

| | | |
|---|---|---|
| 459,536 | Simon | Sept. 15, 1891 |
| 1,175,373 | Noack | Mar. 14, 1916 |
| 1,235,878 | Cole | Aug. 7, 1917 |
| 1,256,520 | Coughlin | Feb. 19, 1918 |
| 2,007,918 | Morse | July 9, 1935 |
| 2,019,709 | Kennedy | Nov. 5, 1935 |
| 2,035,736 | Baird | Mar. 31, 1936 |
| 2,097,862 | McKay | Nov. 2, 1937 |